US011332340B2

(12) United States Patent
Muncy et al.

(10) Patent No.: US 11,332,340 B2
(45) Date of Patent: May 17, 2022

(54) ELEVATOR CONTROL AND USER INTERFACE SYSTEM

(71) Applicant: TK Elevator Innovation and Operations GmbH, Essen (DE)

(72) Inventors: Matthew Muncy, Germantown, TN (US); Sean Luis Stecker, Kennesaw, GA (US); Chih Hung Aaron King, Sharpsburg, GA (US)

(73) Assignee: TK ELEVATOR INNOVATION AND OPERATIONS GMBH, Essen (DE)

( * ) Notice: Subject to any disclaimer, the term of this patent is extended or adjusted under 35 U.S.C. 154(b) by 850 days.

(21) Appl. No.: 16/115,194

(22) Filed: Aug. 28, 2018

(65) Prior Publication Data

US 2020/0071123 A1 Mar. 5, 2020

(51) Int. Cl.
*B66B 1/46* (2006.01)
*B66B 1/28* (2006.01)
(Continued)

(52) U.S. Cl.
CPC ............. *B66B 1/468* (2013.01); *B66B 1/28* (2013.01); *B66B 1/3407* (2013.01); *B66B 1/50* (2013.01); *B66B 9/003* (2013.01); *G05B 19/042* (2013.01); *B66B 2201/463* (2013.01); *B66B 2201/4615* (2013.01); *B66B 2201/4653* (2013.01);
(Continued)

(58) Field of Classification Search
CPC .... B66B 1/46; B66B 1/28; B66B 1/50; B66B 9/003; B66B 19/042; B66B 1/468; B66B 1/3461; B66B 3/008; B66B 5/0012; B66B 1/3423; B66B 2201/20; B66B 7/00; A61G 2203/20
See application file for complete search history.

(56) References Cited

U.S. PATENT DOCUMENTS 7,895,530 B2 * 2/2011 Leavitt .................. G06F 3/0482
715/810
8,875,183 B2 10/2014 Collet et al.
(Continued)

FOREIGN PATENT DOCUMENTS

EP 1870367 A1 12/2007
EP 2692677 A1 2/2014
(Continued)

*Primary Examiner* — Marlon T Fletcher
(74) *Attorney, Agent, or Firm* — The Webb Law Firm

(57) ABSTRACT

An elevator system includes a drive controller configured to actuate a drive motor of an elevator drive assembly. A non-transitory computer-readable medium includes program instructions that cause a processor to retrieve a set of rules of the elevator system, generate at least one graphical user interface by applying the set of rules to at least one design template, calculate an acceptance score for the at least one graphical user interface based on a user profile of an administrator, and publish the at least one graphical user interface based at least partially on the acceptance score. The elevator system further includes a display device configured to display the graphical user interface after it is published and cause the drive controller to actuate the drive motor based on user input of a selection of at least one selectable option on the at least one graphical user interface.

20 Claims, 12 Drawing Sheets

(51) Int. Cl.
    *B66B 1/34*         (2006.01)
    *B66B 1/50*         (2006.01)
    *B66B 9/00*         (2006.01)
    *G05B 19/042*     (2006.01)

(52) U.S. Cl.
    CPC ......... *B66B 2201/4676* (2013.01); *G05B 2219/25252* (2013.01); *G05B 2219/2659* (2013.01)

(56) References Cited

U.S. PATENT DOCUMENTS

| | | | |
|---|---|---|---|
| 2009/0320088 A1* | 12/2009 | Gill | G06Q 10/00 726/1 |
| 2014/0189572 A1* | 7/2014 | Martens | G06F 3/04817 715/780 |
| 2015/0045956 A1* | 2/2015 | Joyce | G05B 15/02 700/275 |
| 2016/0180468 A1* | 6/2016 | Buss | G06K 9/00691 705/4 |
| 2017/0131867 A1* | 5/2017 | Anbil Parthipan | G06N 5/022 |
| 2019/0031467 A1* | 1/2019 | Simcik | G06F 3/04883 |
| 2020/0071123 A1* | 3/2020 | Muncy | B66B 1/28 |

FOREIGN PATENT DOCUMENTS

| | | | | |
|---|---|---|---|---|
| EP | 3560871 A1 * | 10/2019 | | B66B 5/0012 |
| WO | 2013012409 A1 | 1/2013 | | |
| WO | 2016042200 A1 | 3/2016 | | |

* cited by examiner

ELEVATOR CONTROL AND USER INTERFACE SYSTEM

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

Field of the Invention

The present disclosure is generally directed to an elevator control and user interface system, and in some non-limiting embodiments, to an elevator control and user interface system having one or more graphical user interfaces generated at least partially based on machine learning.

Description of Related Art

Elevators for transporting passengers and goods vertically and horizontally between and across floors are ubiquitous in both commercial and residential buildings. Typically, an elevator system includes buttons or other input devices that allow a passenger to select a destination prior to or upon entering the elevator car. Historically, typical elevator systems include a first input device in a waiting area that allows a passenger to select whether they were travelling up to a higher floor or down to a lower floor. Selection of the appropriate option from the first input device triggers the elevator system to stop an elevator car at the waiting area. A second input device located inside the elevator car allows the passenger to select a specific destination floor upon entering the elevator car. In some modern elevator systems, for example, the input device(s) may include a graphical user interface. In some elevator systems, the input device in the waiting area may allow the passenger to select a destination floor from the waiting area rather than from inside the elevator car. In such arrangements, the input device located within the elevator car may have reduced functionality, or may be eliminated.

Elevator systems utilizing graphical user interfaces often have a drawback of requiring a complicated initial setup as many variables and parameters must be decided upon by the owner and/or administrator of the elevator system. Typically, the design of the graphical user interface requires the assistance of a designer skilled in specific software and hardware disciplines used in the elevator system. The design process is iterative and often requires the preparation, review, and approval of many drafts before a finalized design is decided upon and implemented. This process is inefficient and often involves a substantial amount of man hours, both from the designer and the administrator, and a substantial amount of computing resources.

SUMMARY OF THE INVENTION

In view of the foregoing, there exists a need for a more efficient elevator control and user interface system. Additionally, there exists a need for methods for more efficient elevator control via a user interface.

Non-limiting embodiments of the present disclosure are directed to an elevator system. The elevator system includes a drive controller configured to actuate a drive motor of an elevator drive assembly and a non-transitory computer-readable medium including program instructions that, when executed by at least one processor, cause the at least one processor to retrieve, from an elevator display profile, a set of rules including one or more hardware rules of a first component, one or more software rules of a second component, and one or more elevator operation rules of the elevator system. The program instructions, when executed by at least one processor, further cause the at least one processor to generate at least one graphical user interface by applying the set of rules to at least one graphical design template, calculate an acceptance score for the at least one graphical user interface based on a user profile of an administrator or administrator feedback, and publish the at least one graphical user interface based at least partially on the acceptance score to a display device. The display device is in communication with the drive controller and the non-transitory computer-readable medium, and is configured to display the at least one graphical user interface after it is published and cause the drive controller to actuate the drive motor based on user input of a selection of at least one selectable option on the at least one graphical user interface.

In some non-limiting embodiments, the elevator system further includes an elevator shaft having a support frame and an elevator car movable along a vertical path or a horizontal path defined by the elevator shaft.

In some non-limiting embodiments, the at least one processor includes the drive controller.

In some non-limiting embodiments, the first component and the second component each comprise the display device.

In some non-limiting embodiments, the display device includes a touchscreen interface.

In some non-limiting embodiments, the touchscreen interface includes at least one button, one or more of the elevator operation rules define drive instructions for actuating the drive motor, and causing the drive controller to actuate the drive motor based on the user input includes transmitting the drive instructions to the drive controller in response to the user selecting the at least one button.

In some non-limiting embodiments, one or more of the software rules includes a contrast ratio between at least two of the following: a button, a page background, a button border, button text, a button background, a text box border, a text box background, text box text, and an image.

In some non-limiting embodiments, one or more of the hardware rules includes at least one of a size of the touchscreen interface, a resolution of the touchscreen interface, a display brightness, a color balance, and a color support.

In some non-limiting embodiments, the at least one graphical user interface is published based at least partially on the acceptance score by determining if the at least one graphical user interface satisfies a threshold score, displaying the at least one graphical user interface to the administrator, and, in response to receiving approval from the administrator, storing the at least one graphical user interface in a database.

In some non-limiting embodiments, calculating the acceptance score for the at least one graphical user interface includes assigning a value to one or more parameters of the at least one graphical user interface and performing a regression analysis to compare the one or more parameters of the at least one graphical user interface to the same one or more parameters of at least one previously-generated graphical user interface stored in the database.

In some non-limiting embodiments, the program instructions, when executed by at least one processor, further cause the at least one processor to update the user profile of the administrator or administrator feedback based at least partially on feedback received from the administrator, generate at least one additional graphical user interface by applying the set of rules to the at least one design template, and calculate a new acceptance score for the at least one additional graphical user interface based on the updated user profile of the administrator.

In some non-limiting embodiments, applying the set of rules to the at least one design template includes determining whether a conflict exists between any of the one or more software rules and any of the one or more elevator operation rules and prioritizing any of the one or more software rules over all of the elevator operation rules in response to determining that the conflict exists.

Other non-limiting embodiments of the present disclosure are directed to a computer-implemented method for controlling an elevator system. The method includes retrieving, with at least one processor, from an elevator display profile, a set of rules including one or more hardware rules of a first component, one or more software rules of a second component, and one or more elevator operation rules of the elevator system. The method further includes generating, with the at least one processor, at least one graphical user interface by applying the set of rules to at least one design template. The method further includes calculating, with the at least one processor, an acceptance score for the at least one graphical user interface based on a user profile of an administrator or administrator feedback. The method further includes publishing, with the at least one processor, the at least one graphical user interface based at least partially on the acceptance score. The method further includes displaying, with the at least one processor, the at least one graphical user interface on a display device after the at least one graphical user interface is published. The method further includes receiving user input of a selection of at least one selectable option on the at least one graphical user interface and causing a drive controller to actuate a drive motor of an elevator drive assembly based on the user input.

In some non-limiting embodiments, the at least one graphical user interface includes at least one button, one or more of the elevator operation rules define drive instructions for actuating the drive motor, and causing the drive controller to actuate the drive motor based on the user input includes transmitting the drive instructions to the drive controller in response to the user selecting the at least one button.

In some non-limiting embodiments, publishing the at least one graphical user interface includes determining, with the at least one processor, if the at least one graphical user interface satisfies a threshold score, displaying, with the at least one processor, the at least one graphical user interface to the administrator, and, in response to receiving approval from the administrator, storing the at least one graphical user interface in a database.

In some non-limiting embodiments, the method further includes updating, with the at least one processor, the user profile of the administrator based at least partially on feedback received from the administrator, generating, with the at least one processor, at least one additional graphical user interface by applying the set of rules to the at least one design template, and calculating, with at least one processor, a new acceptance score for the at least one additional graphical user interface based on the updated user profile of the administrator.

In some non-limiting embodiments, applying the set of rules to the at least one design template includes determining, with the at least one processor, whether a conflict exists between any of the one or more software rules and any of the one or more elevator operation rules; and prioritizing, with the at least one processor, any of the one or more software rules over all of the elevator operation rules in response to determining that the conflict exists.

Other non-limiting embodiments of the present disclosure are directed to an elevator control apparatus for controlling an elevator system. The elevator control apparatus includes a non-transitory computer-readable medium including program instructions that, when executed by at least one processor, cause the at least one processor to retrieve, from an elevator display profile, a set of rules including one or more hardware rules of a first component, one or more software rules of a second component, and one or more elevator operation rules of the elevator system. The program instructions, when executed by at least one processor, further cause the at least one processor to generate at least one graphical user interface by applying the set of rules to at least one design template, calculate an acceptance score for the at least one graphical user interface based on a user profile of an administrator, and publish the at least one graphical user interface based at least partially on the acceptance score.

In some non-limiting embodiments, publishing the at least one graphical user interface includes determining if the at least one graphical user interface satisfies a threshold score and, in response to receiving approval from the administrator, storing the at least one graphical user interface in a database.

In some non-limiting embodiments, calculating an acceptance score for the at least one graphical user interface includes assigning a value to one or more parameters of the at least one graphical user interface and performing a regression analysis to compare the one or more parameters of the at least one graphical user interface to the same one or more parameters of at least one previously-generated graphical user interfaces stored in the database.

These and other features and characteristics of elevator systems, methods for control thereof, and implementations thereof will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and claims, the singular forms of "a", "an", and "the" include plural referents unless the context clearly dictates otherwise.

DETAILED DESCRIPTION OF THE INVENTION

Figure 1A:
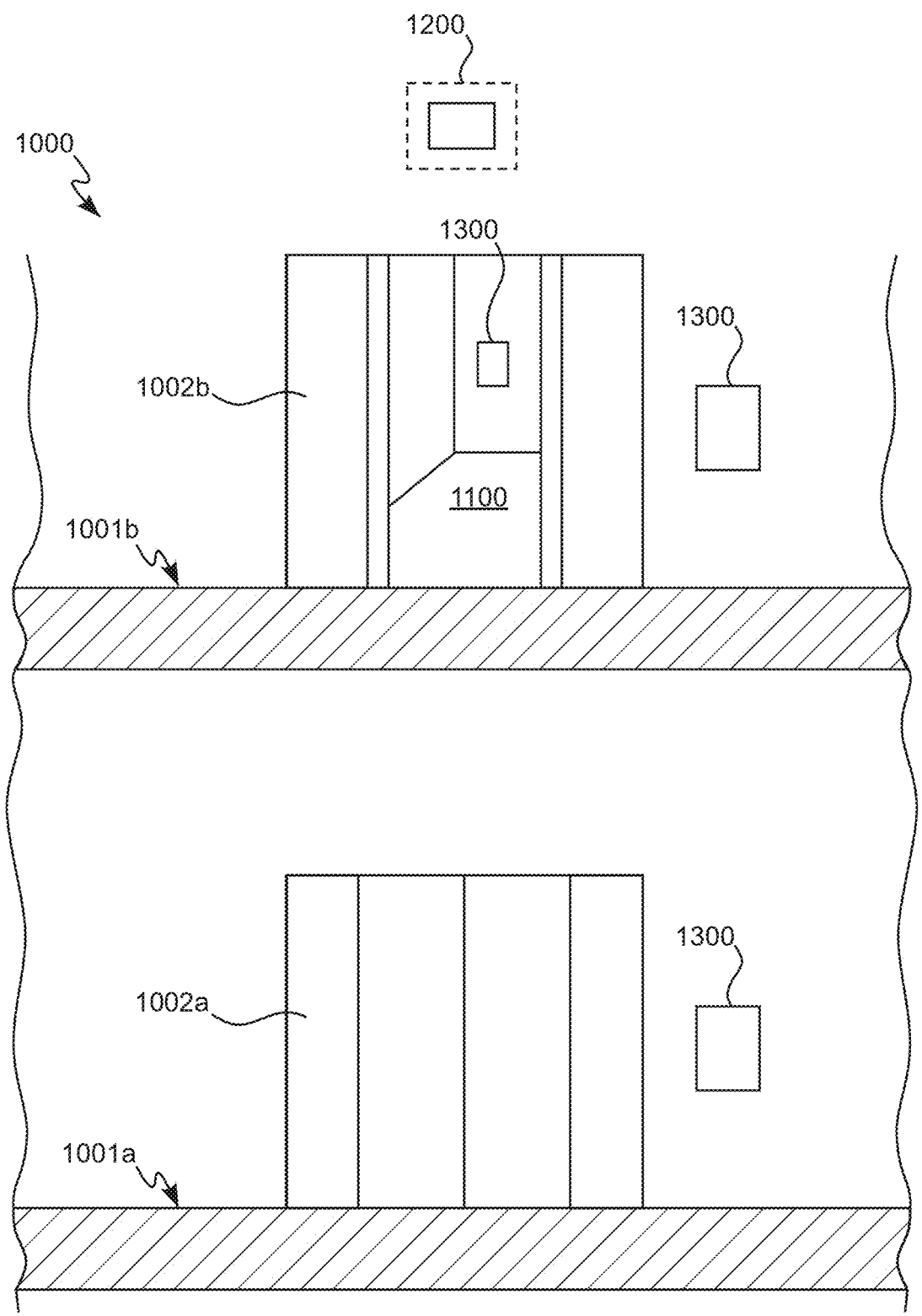
FIG. 1A is a partial perspective view of an elevator system according to an embodiment of the present disclosure.

For purposes of the description hereinafter, the terms "upper", "lower", "right", "left", "vertical", "horizontal", "top", "bottom", "lateral", "longitudinal", and derivatives thereof shall relate to the disclosed apparatus as it is oriented in the figures. However, it is to be understood that the apparatus of the present disclosure may assume alternative variations and step sequences, except where expressly specified to the contrary. It is also to be understood that the specific systems and processes illustrated in the attached drawings and described in the following specification are simply exemplary examples of the apparatus disclosed herein. Hence, specific dimensions and other physical characteristics related to the examples disclosed herein are not to be considered as limiting.

As used herein, the term "associated with", when used in reference to multiple features or structures, means that the multiple features or structures are in contact with, touching, directly connected to, indirectly connected to, adhered to, or integrally formed with one another.

As used herein, the term "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, or F. For example, "at least two of D, E, and F" includes one or more of D and one or more of E; or one or more of D and one or more of F; or one or more of E and one or more of F; or one or more of all of D, E, and F.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers or other computerized devices, directly or indirectly communicating in the network environment may constitute a "system". Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the terms "computer" and "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. In other non-limiting embodiments, the computing device may be a desktop computer or other non-mobile computer. Furthermore, the term "computer" may refer to any computing device that includes the necessary components to receive, process, and output data, and normally includes a display, a processor, a memory, an input device, and a network interface. An "application programming interface" (API) refers to computer code or other data sorted on a computer-readable medium that may be executed by a processor to facilitate the interaction between software components, such as a client-side front-end and/or server-side back-end for receiving data from the client. A "graphical user interface" or "GUI" refers to a generated display with which a user may interact, either directly or indirectly (e.g., through a keyboard, mouse, touchscreen etc.).

As used herein, the term "machine learning" means a process of a computing device following an algorithm to parse data and make a determination, classification, or prediction about the data or about a function based on the data, to improve performance of one or more specific tasks. Machine learning may be characterized as "supervised learning" or "unsupervised learning" based on the specific steps of the algorithm. In supervised learning, the algorithm maps an input to an output based on example input-output pairs. An example of a supervised learning algorithm is the k-nearest neighbors (k-NN) algorithm, which can be used for either classification or regression of objects. In k-NN classification, objects of known class membership are mapped in a feature space according to the value of their inputs. An object having unknown class membership may then be mapped according to the value of its input among the objects of known class membership. The latter object is assigned to the class most common among its k nearest neighbors in the feature space, where k is a positive integer. For example, if k=1, then the object is simply assigned to the class of its single nearest neighbor. In unsupervised learning, the algorithm infers a function that describes the structure of unclassified and/or uncategorized objects. In contrast to supervised learning, the objects in unsupervised learning do not include known outputs. Rather, objects are clustered into different groups based on their structure. An example of an unsupervised learning algorithm is the k-means algorithm. As used herein, machine learning is not limited to supervised learning, unsupervised learning, or any particular algorithm. Rather, as used herein, machine learning encompasses any algorithms for allowing a computing device to progressively improve performance on one or more specific tasks.

Non-limiting embodiments of the present disclosure are directed to elevator systems having display devices which allow users to control various functions of the elevator system via interaction with one or more graphical user interfaces (GUI). The one or more GUIs may be generated based at least partially on machine learning processes and feedback received from an administrator of the elevator system to improve the accessibility and usability of the elevator system to the user. Additionally, the probability of generating one or more GUIs which appeals to an administrator is improved.

Figure 1B:
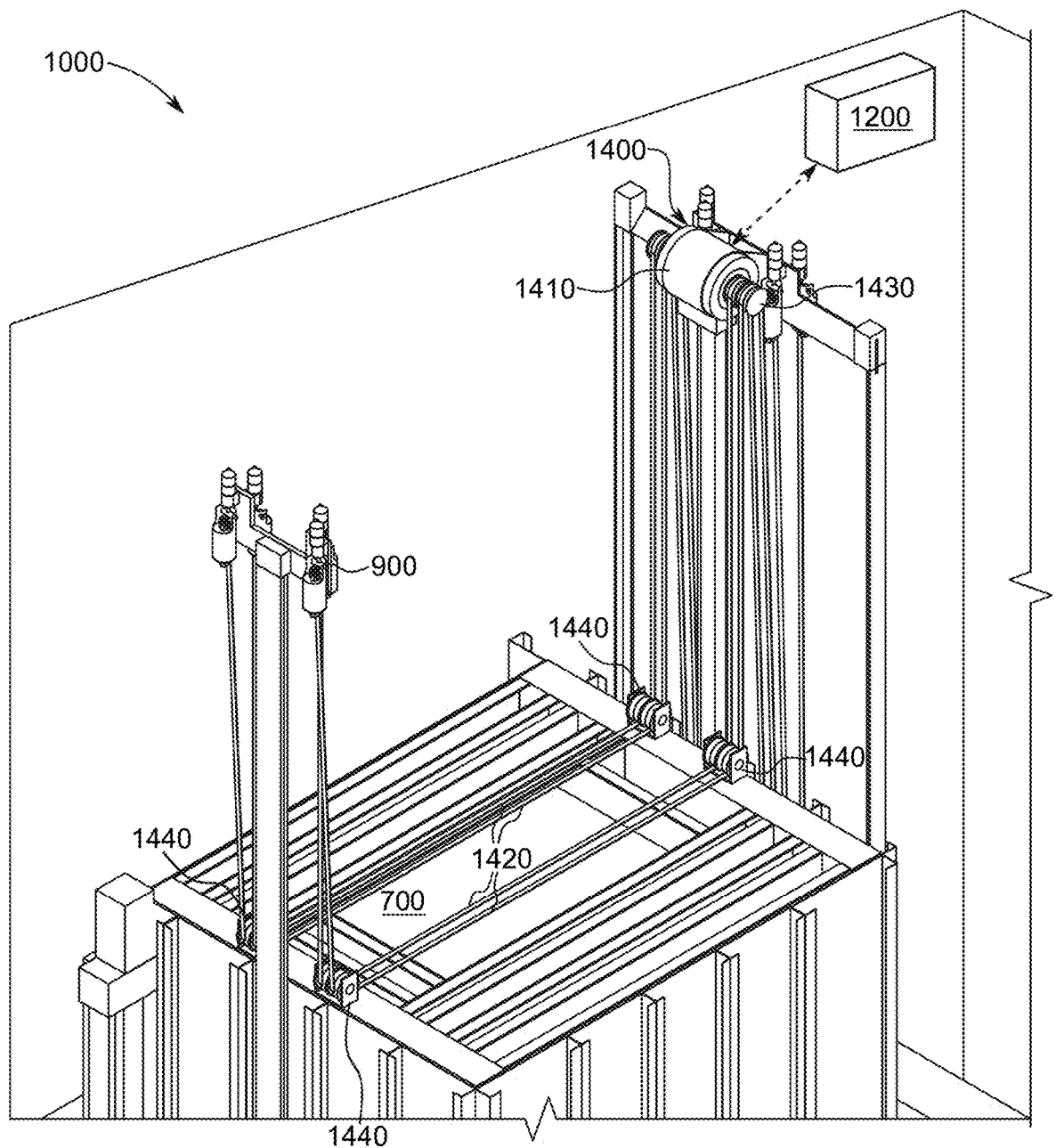
FIG. 1B is a partial perspective view of an embodiment of the elevator system of FIG. 1A.

Referring now to FIGS. 1A-1B, an elevator system 1000 according to some non-limiting embodiments of the present disclosure includes an elevator car 1100 which travels between a plurality of floors 1001a, 1001b of a building. While two floors, namely a first floor 1001a and a second floor 1001b, are shown in FIG. 1A, it is to be understood that the building may include, and the car 1100 may travel between, any number of floors. Each floor 1001a, 1001b serviced by the elevator system 1000 includes corresponding doors 1002a, 1002b which open to allow passengers and goods into the car 1100 when the car 1100 stops at the corresponding floor 1001a, 1001b. The doors 1002a, 1002b close when the car 1100 is in motion or when the car 1100 is stopped at a floor corresponding to a different door. For example, as shown in FIG. 1A, the car 1100 is stopped on the second floor 1001b and the corresponding door 1002b is open to allow passengers and goods to enter the car 1100 at the second floor 1001b. The door 1002a of the floor 1001a is closed to prohibit passengers and goods from attempting to enter the car 1100 which is not present on the first floor 1001a.

Movement of the car 1100 between the floors 1001a, 1001b is controlled by a drive controller 1200. The drive controller 1200 may be in communication with one or more user interfaces 1300a-1300c. The one or more user interfaces 1300a-1300c may be located inside the car 1100, outside the car 1100, or a combination thereof. For example, the embodiment shown in FIG. 1A includes a first user interface 1300a inside the car 1100, a second user interface 1300b outside the car 1100 on the first floor 1001a, and a third user interface 1300c outside the car 1100 on the second floor 1001b. The first user interface 1300a may be wall-mounted, as shown in FIG. 1A, or may be a kiosk mounted remotely from the car 1100. Some non-limiting embodiments may lack the second and third user interfaces 1300b-1300c located inside the car 1100. Each of the one or more user interfaces 1300a-1300c is configured to receive at least one input from a user and transmit an instruction to the drive controller 1200 that causes the car 1100 to move.

Referring now to FIG. 1B, the drive controller 1200 is in communication with an elevator drive assembly 1400 which may include a drive motor 1410. In some non-limiting embodiments, the elevator drive assembly 1400 may be a traction belt drive system including, for example, one or more tension members 1420 connecting the elevator car to a counterweight (not shown). One or more of the tension members 1420 may be frictionally engaged to one or more drive sheaves 1430 coupled to the drive motor 1410 such that actuation of the drive motor 1410 by the drive controller 1200 causes rotation of the one or more drive sheaves 1430, thereby moving the car 1100 along a vertical travel path. The tension members 1420 may be routed around any number of idler sheaves 1440 to alter the direction of the tension force applied by the tension members 1420 on the elevator car 1100 and the counterweight.

In other non-limiting embodiments, the elevator drive assembly 1400 may be a hydraulic system in which the drive motor 1410 is coupled to a pump such that actuation of the drive motor 1410 by the drive controller 1200 causes the pump to circulate fluid to one or more hydraulic cylinders which extend and retract to move the car 1100 vertically and/or horizontally.

In still other non-limiting embodiments, the drive motor 1410 may be one or more linear actuators which, when actuated by the drive controller 1200, cause the car 1100 to translate vertically and/or horizontally along one or more rails. It will be appreciated that non-limiting embodiments may be utilized with any suitable elevator system and that the elevator systems shown in FIGS. 1A-1B are exemplary only.

Figure 2:
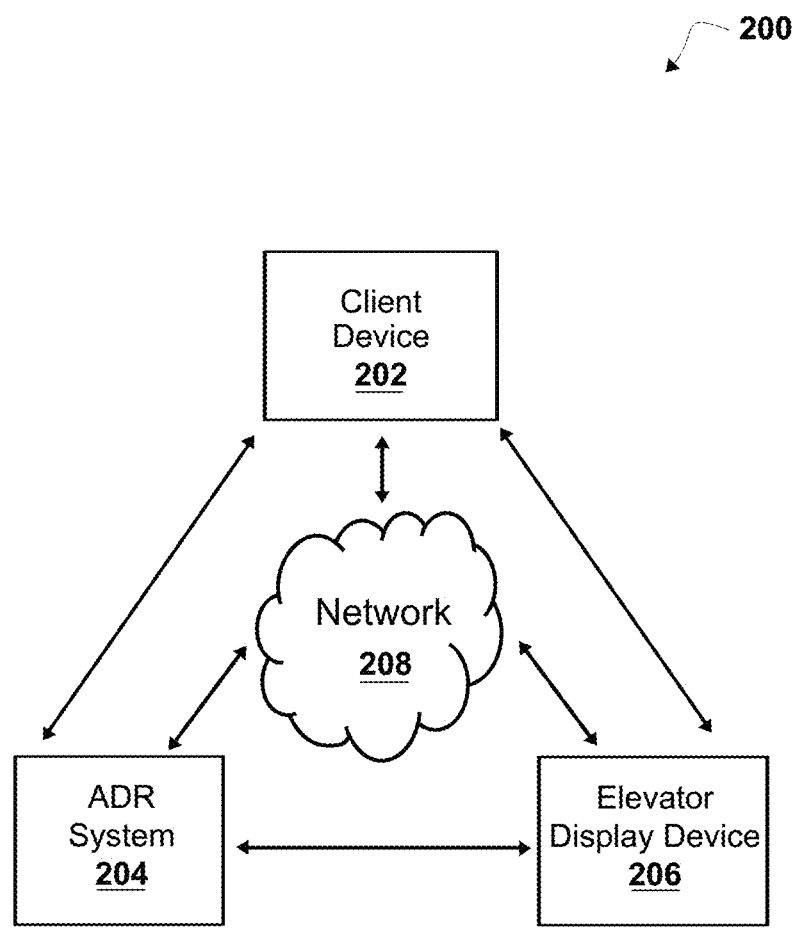
FIG. 2 is a diagram of an embodiment of an environment in which the elevator system of FIGS. 1A-1B may be implemented.

Referring now to FIG. 2, the elevator systems, apparatuses, and/or methods described herein may be implemented in an environment 200. The environment 200 may include a client device 202, an automated designer and recommendation (ADR) system 204, an elevator display device 206, and a network 208.

The client device 202 may include one or more devices capable of receiving information from and/or communicating information to the ADR system 204 and/or the elevator display device 206. For example, the client device 202 may include one or more computing devices such as a computer, a server, a mobile device, or any combination thereof. The client device 202 may be associated with an entity that operates and/or maintains the elevator system, such as an administrator. The administrator may include, for example, any user of the client device 202 such as an owner, proprietor, manager, designer, etc. of the elevator system 1000, or any combination thereof. The administrator may be a single entity or more than one entity and, if the latter, the multiple entities may act in concert via the ADR system 204.

The ADR system 204 may include one or more devices capable of receiving information from and/or communicating information to the client device 202 and/or the elevator display device 206. For example, the ADR system 204 may include one or more computing devices such as a server, a group of servers, and/or the like. It will be appreciated that the ADR system 204 may also be a subsystem of an existing system such as, but not limited to, one or more software applications executing on one or more processors.

The elevator display device 206 may include one or more devices capable of receiving information from and/or communicating information to the client device 202 and the ADR system 204. For example, the elevator display device 206 may include one or more computing devices having an electronic visual display capable of displaying a graphical user interface (GUI), such as one or more monitors, touchscreens, or the like. Further, the elevator display device 206 may include or be in communication with one or more input devices capable of receiving input such as a touch screen display, a keyboard, a keypad, a mouse, a button, a switch, a microphone, and/or the like. In some non-limiting embodiments, the display device 206 may correspond to, be included in, or include the user interfaces 1200a-1200c, as shown and described with reference to FIG. 1A.

The network 208 may include one or more wired and/or wireless networks. For example, the network 208 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., a public switched telephone network (PSTN)), a private network, an ad hoc network, a fiber optic-based network, a cloud computing network, and/or any combination of these or other types of networks.

Figure 3:
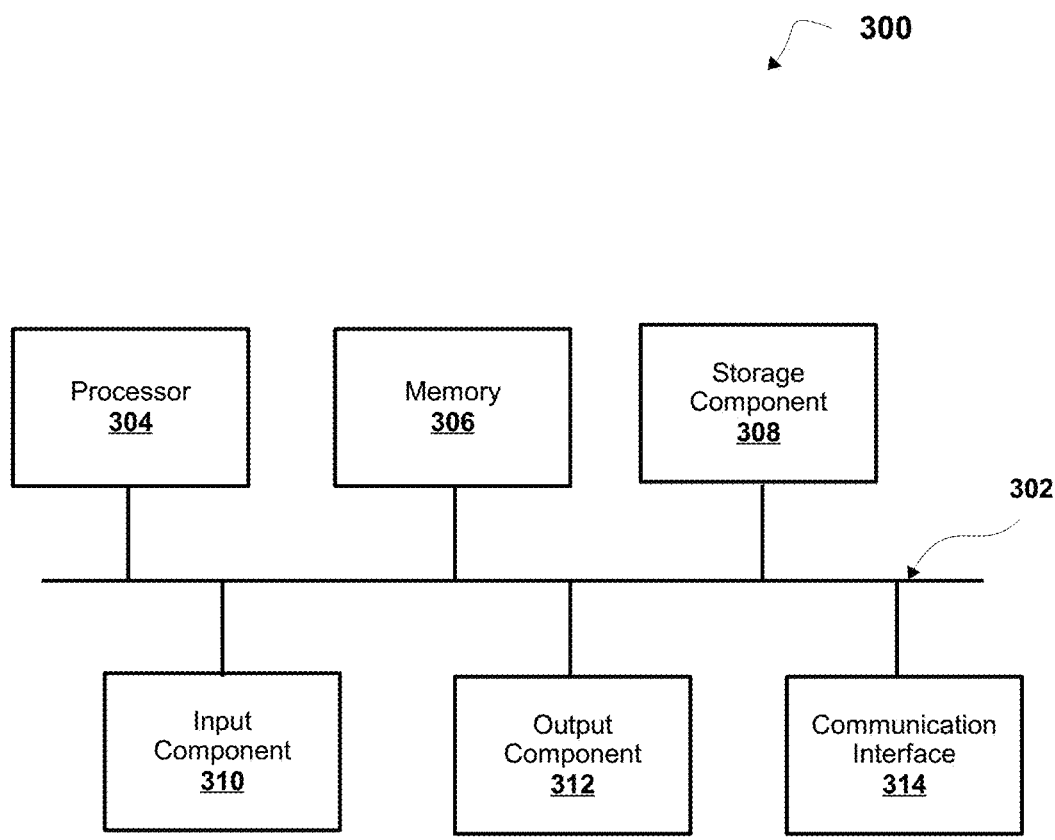
FIG. 3 is a diagram of an embodiment of components of one or more devices of FIG. 2.

FIG. 3 shows a diagram of example components of a device 300. In some non-limiting embodiments, the device 300 may correspond to one or more devices of the client device 202, one or more devices of the ADR system 204, and/or one or more devices of the elevator display device 206. In some non-limiting embodiments, the client device 202, the ADR system 204, and the elevator display device 206 may include at least one device 300 and/or at least one component of the device 300. As shown in FIG. 3, the device 300 may include a bus 302, a processor 304, memory 306, a storage component 308, an input component 310, an output component 312, and a communication interface 314.

The bus 302 may include a component that permits communication among the components of the device 300. In some non-limiting embodiments, the processor 304 may be implemented in hardware, firmware, or a combination of hardware and software. For example, the processor 304 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. The memory 306 may include random access memory (RAM), read only memory (ROM), and/or another type of dynamic or static storage device (e.g., flash memory, magnetic memory, optical memory, and/or the like) that stores information and/or instructions for use by the processor 304.

The storage component 308 may store information and/or software related to the operation and use of the device 300. For example, the storage component 308 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

The input component 310 may include a component that permits the device 300 to receive information, such as via user input (e.g., a touch screen display, a keyboard, a keypad, a mouse, a button, a switch, a microphone, and/or the like). Additionally, or alternatively, the input component 310 may include a sensor for sensing information (e.g., a global positioning system (GPS) component, an accelerometer, a gyroscope, an actuator, and/or the like). The output component 312 may include a component that provides output information from the device 300 (e.g., a display, a speaker, one or more light-emitting diodes (LEDs), and/or the like). The input component 310 and/or the output component 312 may correspond to, be included in, or include the elevator display device 206, as described above.

The communication interface 314 may include a transceiver-like component (e.g., a transceiver, a receiver and transmitter that are separate, and/or the like) that enables the device 300 to communicate with other devices, such as via a wired connection, a wireless connection, or a combination of wired and wireless connections. The communication interface 314 may permit the device 300 to receive information from another device and/or provide information to another device. For example, the communication interface 314 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 300 may perform one or more processes described herein. The device 300 may perform these processes based on the processor 304 executing software instructions stored by a computer-readable medium, such as the memory 306 and/or the storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into the memory 306 and/or the storage component 308 from another computer-readable medium or from another device via the communication interface 314. When executed, the software instructions stored in the memory 306 and/or the storage component 308 may cause the processor 304 to perform one or more processes described herein. Additionally, or alternatively, hardwired circuitry may be used in place of or in combination with the software instructions to perform one or more processes described herein. Thus, non-limiting embodiments described herein are not limited to any specific combination of hardware circuitry and software.

The number and arrangement of the components shown in FIG. 3 are provided as an example. In some non-limiting embodiments, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
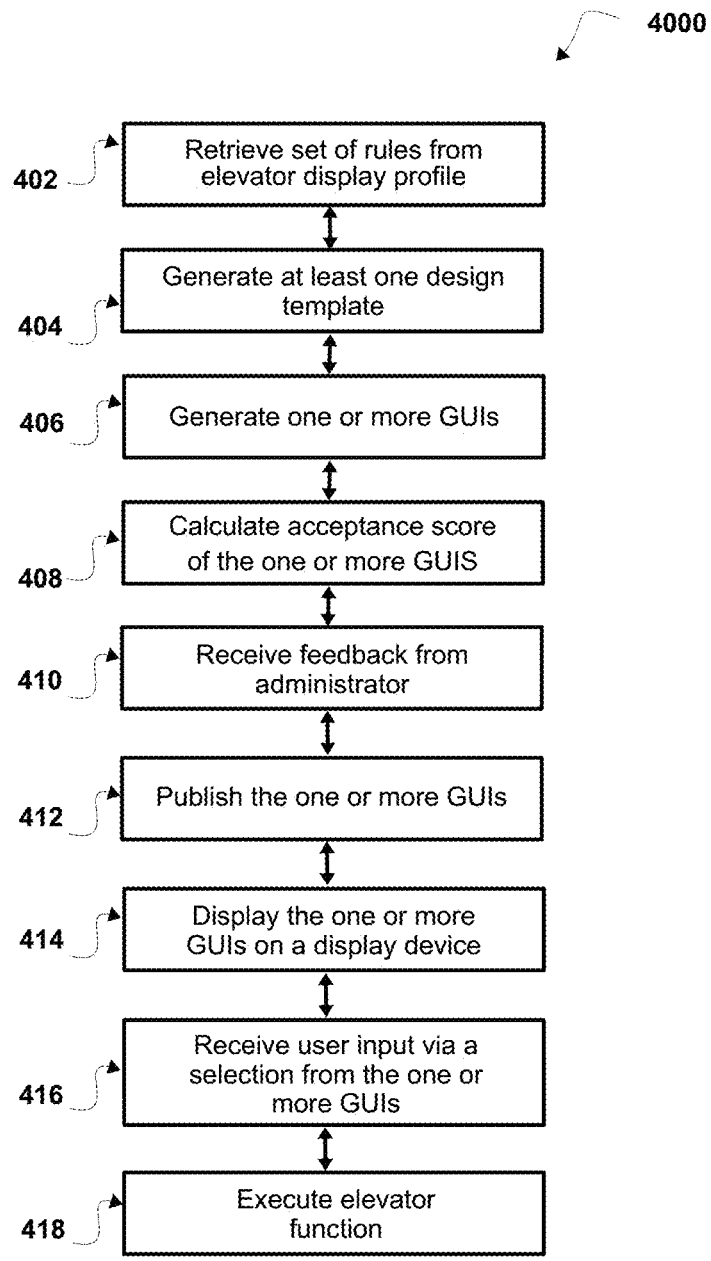
FIG. 4 is a flowchart of a method for controlling the elevator system of FIGS. 1A-1B according to an embodiment of the present disclosure.

FIG. 4 is a flowchart of an embodiment of a method 4000 for generating one or more GUIs and controlling an elevator system, such as the elevator system 1000 of FIGS. 1A and 1B, operating in the environment of FIG. 2. In some non-limiting embodiments, one or more of the steps of the method 4000 may be performed, either completely or partially, by the client device 202, the ADR system 204, and/or the display device 206. Generally, the method 4000 includes steps for generating one or more graphical user interfaces (GUIs), displaying the one or more GUIs on the display device 206, and causing the elevator system 1000 to operate based on a user input received via the display device 206. The method 4000 will now be described more particularly with reference to steps 402, 404, 406, 408, 410, 412, 414, 416, and 418 as shown in FIG. 4.

At step 402, the method 4000 includes retrieving a set of rules from an elevator display profile. For example, the ADR system 204 may retrieve the set of rules from the elevator display profile stored in memory or a storage component of the ADR system 204. The elevator display profile includes information unique to the elevator system 1000 including, for example, the set of rules. The set of rules includes individual rules that may be divided into categories including: one or more hardware rules associated with at least one first component of the elevator system 1000, one or more software rules associated with at least one second component of the elevator system 1000, and one or more elevator operation rules associated with the elevator system 1000. The at least one first component and the at least one second component may be the same component or different components. For example, in the embodiment of the elevator system 1000 illustrated in FIG. 1A, the at least one first component may be one or more of the drive controller 1200, the first user interface 1300a, the second user interface 1300b, and the third user interface 1300c. Similarly, the at least one second component may be one or more of the drive controller 1200, the first user interface 1300a, the second user interface 1300b, and the third user interface 1300c.

The one or more hardware rules may include information relating to a hardware-based constraint of one or more of the components. For example, the one or more hardware rules may include a rule specifying a screen size of the one or more user interfaces 1300a-1300c, a screen resolution of the one or more user interfaces 1300a-1300c, a display brightness of the one or more user interfaces 1300a-1300c, a color balance of the one or more user interfaces 1300a-1300c, and/or a color support of the one or more user interfaces 1300a-1300c. The one or more software rules may include information relating to a software-based constraint of the one or more of the components. For example, the one or more software rules may include a rule specifying a minimum contrast ratio between background colors and text of objects on the one or more graphical user interfaces. The one or more elevator operation rules may include each status and/or function of the elevator system 1000 that is to be displayed to and/or controlled by a user via the display device 206. For example, the elevator operation rules may include a rule specifying that the display device 206 displays specific branding and a real-time indication of the floor of the building at which the elevator car 1100 is located. The set of rules may include additional categories beyond hardware rules, software rules, and elevator operation rules. Individual rules may overlap more than one of the categories of rules. For example, one of the individual rules may be characterized as both a software rule and an elevator operation rule.

As further shown in FIG. 4, at step 404, the method 4000 includes generating at least one graphical design template to which the one or more GUIs may be applied. The at least one design template defines an architecture or framework for objects such as buttons, textboxes, backgrounds, images, icons, selectable options, menu styles, and the like which are to be displayed to the user via the display device 206. Some or all of the objects may also be configured to be selectable by the user via the display device 206 to effect an operation of the elevator system 1000. The at least one design template may be generated by the ADR system 204 based at least partially on the set of rules retrieved by the ADR system 204 at step 402.

For example, the one or more hardware rules may include a rule specifying that the screen resolution of the display device 206 is 1600 pixels wide by 900 pixels high. Accordingly, the ADR system 204 may generate the at least one design template having a resolution of 1600 pixels wide by 900 pixels high. The one or more software rules may include a rule specifying that the display device 206 must display specific iconography pursuant to jurisdictional fire codes. Accordingly, the ADR system 204 may generate the at least one design template to include a section dedicated for the display of such iconography. The one or more elevator operation rules may include a rule specifying that the display device 206 displays specific branding and a real-time indication of the floor of the building at which the elevator car 1100 is located. Accordingly, the ADR system 204 may generate the at least one design template having sections dedicated for the branding and real-time car location indicator. Further, the one or more elevator operation rules may include a rule specifying that the user must be able to select one of a plurality of floors to travel to. Accordingly, the ADR system 204 may generate the at least one design template to include a section that facilitates display of the available floors that the user may select.

In some instances, various individual rules of the set of rules retrieved at step 402 may conflict with one another. For example, the one or more software rules may include a rule specifying a contrast ratio between text color and background color, as required by relevant regulatory agencies. However, the one or more elevator operation rules may include a rule specifying a branding color scheme that does not meet the contrast ratio prescribed by the one or more software rules. In such conflicts, the one or more software rules may by prioritized over the one or more elevator operation rules. The conflicting elevator operation rule may be either ignored or modified to resolve the conflict. In some non-limiting embodiments, the ADR system 204 may be configured to automatically identify and resolve any conflicts within the set of rules. As each of the individual rules are analyzed by the ADR system 204 and implemented into the at least one template, the ADR system 204 may identify any individual rule or rules that cannot be implemented without interfering with one or more other individual rules or combinations of rules. The ADR system 204 may then determine whether each of the conflicting rules is a hardware rule, a software rule, or an elevator operation rule. If one of the conflicting rules is a software rule, the ADR system 204 automatically implements that software rule and, at least temporarily, does not implement any conflicting elevator operation rules. The ADR system 204 then determines whether the conflicting elevator operation rule can be modified to avoid a conflict with the one or more software rules. If the conflicting elevator operation rule can be so modified, the ADR system 204 automatically implements a modified version of the conflicting elevator operation rule to avoid the conflict. For example, if the one or more elevator operation rules includes a color scheme that conflicts with a contrast ratio required by the one or more software rules, the ADR system 204 may adjust the color scheme of the one or more elevator operation rules to adhere to the contrast ration of the one or more software rules. If the conflicting elevator operation rules cannot be modified to avoid a conflict with the one or more software rules, the conflicting elevator operation rule is not implemented and may be automatically removed from the set of rules.

As further shown in FIG. 4, at step 406, the method 4000 includes generating one or more GUIs to be applied to the at least one design template. The one or more GUIs include the same objects as the at least one design template generated at step 404, and further include physical parameters which allow the objects to be visually represented on the display device 206. The parameters of the objects may include size, shape, color, typeface, accents, location, background, borders, text, images, and the like. In some non-limiting embodiments, the ADR system 204 may automatically assign the parameters to the objects based at least partially on: known preferences of the administrator, an extrapolation based on known preferences of the administrator, the set of rules retrieved at step 402, predefined or dynamic rules for artistic and/or industrial design, random selection, and/or combinations thereof.

For example, the ADR system 204 may automatically assign a typeface to one or more objects of the at least one design template by retrieving an administrator profile including information relating to known preferences of the administrator. The administrator profile may include data indicating preferences of the administrator based on analysis performed during previous iterations of the method 4000. The process of promulgating data in the administrator profile will be described in greater detail below with reference to FIG. 5. The ADR system 204 may parse the information in the administrator profile to identify data related to typeface preferences of the administrator. For example, the administrator profile may include data indicating the typeface used on objects of previously-generated GUIs. Based at least partially on this data, the ADR system 204 may automatically identify and/or extrapolate a typeface preference of the administrator. For example, the ADR system 204 may identify and/or extrapolate that the administrator prefers serif typefaces. The ADR system 204 may then automatically assign a serif typeface to one or more objects of the at least one design template to at least partially generate the one or more GUIs.

By further example, parameters may be assigned to one or more objects of the at least one design by applying predefined or dynamic rules for artistic and/or industrial design. For example, a first color may be assigned to text of an object based on qualities such as ease of readability. A second color may then be assign to a background of that object which visually harmonizes with the color assigned to the text of the object. For example, if the text of the object is assigned the color blue, the background of the object may be assigned the color yellow. Similarly, a shape may be assigned to the object which visually harmonizes with the other parameters already assigned to the object, for example, the typeface and color. Assignment of the first color, second color, and shape parameters may be performed automatically by, for example, the ADR system 204. The rules for artistic and/or industrial design may be altered or updated, for example via a machine learning process, after subsequent iterations of their application.

Generation of the one or more GUIs at step 406 may be constrained by the set of rules retrieved at step 402. For example, as noted above, the one or more of the software rules may include a rule specifying a minimum contrast ratio between text of an object and the background color of that object. Thus, if the color of the text of an object has been assigned, the one or more software rules would preclude the background of that object from being assigned a color which falls outside the minimum contrast ratio between the background and the already assigned color of the text.

By further example, one or more parameters of an object may be randomly assigned, subject to any constraints imposed by the set of rules retrieved at step 402. If the combination of the administrator profile, artistic design principles, industrial design principles, and the set of rules provides insufficient basis for selecting a parameter of an object, the parameter may be assigned by random selection from a group of suitable options.

It is to be understood that none of the examples described above are to be construed as limiting the manner in which the one or more parameter of objects of the one or more GUIs are assigned. That is, any parameter of an object may be assigned at least partially based on any of known preferences of the administrator, extrapolations based on known preferences of the administrator, the set of rules retrieved at step 402, predefined or dynamic rules for artistic and/or industrial design, random selection, and/or combinations thereof, unless circumstances dictate otherwise.

As further shown in FIG. 4, at step 408, the method 4000 includes calculating an acceptance score of the one or more GUIs generated at step 406. The calculated acceptance score is a measure, estimation, prediction, and/or approximation of the degree to which the one or more GUIs generated at step 406 will appeal to the administrator. Generally, calculating the acceptance score includes assigning a value, such as a numerical value, to one or more aspects of the one or more GUIs. For example, the acceptance score may be normalized to a range of values between zero (0) and one (1). The acceptance score may be calculated using any suitable method including, for example, machine learning, regression analysis, or a combination thereof. In some examples, the acceptance score may be calculated automatically by the ADR system 204. In one such example, the ADR system 204 may retrieve an administrator profile from a server or other device equipped with a non-transitory computer-readable medium. As noted above, the administrator profile may include a database of known and/or aggregated data of preferences unique to the administrator. The ADR system 204 may utilize a machine learning process, such as a k-NN algorithm, to classify the parameters of the objects in the one or more GUIs generated at step 406 based on the data of the administrator profile. Based on this classification of the parameters of the objects in the one or more GUIs, the ADR system 204 may automatically perform a regression analysis or other suitable analysis to determine how closely the parameters of the objects in the one or more GUIs generated at step 406 match known preferences of the administrator retrieved from the administrator profile. The output of the regression analysis or other suitable analysis may be the acceptance score, or additional manipulation may be automatically performed on the output of the regression analysis or other suitable analysis by the ADR system 204 to obtain the acceptance score.

As noted above, the acceptance score is a measure, estimation, prediction, and/or approximation of the degree to which the one or more GUIs generated at step 406 will appeal to the administrator. For example, an acceptance score of near zero (0) may indicate that it is very unlikely that the one or more GUIs will appeal to the administrator, while an acceptance score of near one (1) may indicate that it is very likely that the one or more GUIs will appeal to the administrator. As may be appreciated from the foregoing description, the calculated closeness or proximity of parameters of the one or more GUIs to the data in the administrator profile can increase and/or decrease the acceptance score. For example, if the administrator profile includes data indicating that the administrator prefers serif typefaces, the presence of objects with serif typefaces in the one or more GUIs may increase the calculated acceptance score. Similarly, if the administrator profile includes data indicating that the administrator prefers round buttons, the presence of round buttons in the one or more GUIs may increase the calculated acceptance score. Conversely, the presence of square buttons in the one or more GUIs may decrease the calculated acceptance score.

The ADR system 204 may also take into account ranges of values of the parameters when calculating the acceptance score. For example, the administrator profile may indicate that the administrator prefers yellow colors over blue colors. Thus, the presence of yellow colors in the one or more GUIs may increase the acceptance score by a large value, the presence of green colors in the one or more GUIs may increase the acceptance score by a relatively smaller value, and the presence of blue colors may decrease the acceptance score.

The ADR system 204 may also take into account combinations of parameters when calculating the acceptance score. For example, the administrator profile may include data indicating that the administrator prefers round buttons, but only when the buttons are dark colors. The presence of round, light-colored buttons in the one or more GUIs may thus decrease the calculated acceptance score.

As further shown in FIG. 4, at step 410, the method 4000 includes receiving feedback from the administrator on the one or more GUIs generated at step 406. Step 410 may be optional. Generally, receiving feedback from the administrator may include displaying the one or more GUIs generated at step 406 to the administrator. The one or more GUIs may be displayed to the administrator on a connected device, such as the client device 202. The administrator may then grade, rank, or otherwise classify the one or more GUIs according to the administrator's preferences and/or to what degree the one or more GUIs appeals to the administrator. For example, the administrator may "Like" or "Dislike" the one or more GUIs, the administrator may assign a point value to the one or more GUIs, and/or the administrator may assign another metric to the one or more interfaces. The administrator feedback may be input by the administrator via a user interface of the client device 202 and communicated to the ADR system 204 via the client device 202. The feedback received from the administrator may then be analyzed, manipulated, catalogued, and/or stored for future reference. For example, the ADR system 204 may parse the feedback received from the administrator and store the feedback in the administrator profile as one or more data points or parameter values. In particular, the ADR system 204 may utilize a machine learning algorithm to identify trends in the feedback received from the administrator, which may be utilized in subsequent iterations of step 406 to calculate the acceptance score of the one or more GUIs. Step 410 will be described in greater detail with reference to FIG. 5 and sub-method 5000 after the remaining steps of the method 4000 are described.

As further shown in FIG. 4, at step 412, the method 4000 includes publishing the one or more GUIs based at least partially on the acceptance score calculated at step 408. Publishing the one or more GUIs may include transmitting the one or more GUIs to the display device 206. Once published, the one or more GUIs may then be displayed on the display device 206 or some other storage device in communication with the display device 206. In some non-limiting embodiments, the ADR system 204 may automatically publish the one or more GUIs by transmitting the one or more GUIs to memory of the display device 206. In such non-limiting embodiments, once the one or more GUIs are published, the display device 206 may, at a current or future time, display the one or more GUIs even if the display device 206 is not in communication with the ADR system 204. As such, the display device 206 may be disconnected from the network 208 once the one or more GUIs are published.

As noted above, publication of the one or more GUIs is at least partially based on the acceptance score calculated at step 408. In some non-limiting embodiments, if the acceptance score calculated at step 408 is below a predetermined threshold score, the one or more GUIs may not be displayed to the administrator, and is thus not available to be published. The threshold score may be predetermined based at least partially on the scale used for the acceptance score. For example, if the acceptance score is normalized to a range of values between zero (0) and one (1), the threshold score may be set as 0.6. As describe above with reference to step 408, the acceptance score is a measure, estimation, prediction, and/or approximation of the degree to which the one or more GUIs generated at step 406 will appeal to the administrator. Thus, an acceptance score of 0.6 may indicate that the one or more GUIs may more likely than not appeal to the administrator. Setting the threshold score to 0.6 would thus only display to the administrator those GUIs which are more likely than not to appeal to the administrator. If the acceptance score of the one or more GUIs, as calculated at step 408, does not meet the threshold score, the one or more GUIs are not displayed to the administrator and thus are not published. In contrast, if the acceptance score calculated at step 408 meets the threshold score, the one or more GUIs may be displayed to the administrator and the administrator may select to publish the one or more GUIs.

In some non-limiting embodiments, the administrator may not provide feedback (for example, when step 410 is not included), and the one or more GUIs may be published automatically based at least partially on the acceptance score. For example, the one or more GUIs may be automatically published if the acceptance score satisfies a predetermined publication score. The publication score, like the threshold score, may be contained within the range of values of the acceptance score. For example, if the acceptance score is normalized to a range of values between zero (0) and one (1), the publication score may be set as 0.8, indicating a high probability that the one or more GUIs will appeal to the administrator.

In other non-limiting embodiments, multiple iterations of steps 406 and 408 may be performed a predetermined number of times, and the one or more GUIs having the highest acceptance score may be automatically published.

Publication of the one or more GUIs may also be at least partially based on feedback received from the administrator. For example, at step 410 the administrator may actively select the one or more GUIs to be published by providing an input to the client device 202.

As further shown in FIG. 4, at step 414, the method 4000 includes displaying the one or more GUIs on the display device 206. For example, a processor of the display device 206 may retrieve the one or more GUIs from the memory of the display device 206 where the one or more GUIs was published at step 412. The processor of the display device 206 may then project the one or more GUIs to an electronic visual display, such as a touchscreen, of the display device 206. A user may then interact with the one or more GUIs via the display device 206.

As further shown in FIG. 4, at step 416, the method 4000 includes receiving user input of a selection of at least one selectable option on the one or more GUIs. The at least one selectable option may include, for example, a floor selection option, a door close option, a door open option, and a stop option. Each of the at least one selectable options may be associated with an elevator function of the elevator system 1000. The floor selection option may be associated with an elevator function for moving the elevator car 1100 to one or more floors 1001 of the elevator system 1000. The door close option may be associated with an elevator function to close the door 1002 of the elevator car 1100. The door open option may be associated with an elevator function to open the door of the elevator car 1100. The stop option may be associated with an elevator function to stop movement of the elevator car 1100. Each elevator function may be associated with one or more of the at least one selectable options, and each of the at least one selectable options may be associated with one or more elevator functions. The user may select the at least one selectable option via interaction with the one or more GUIs displayed via the display device 206 at step 414. For example, each of the objects of the one or more GUIs may be associated with one or more of the at least one selectable options.

As further shown in FIG. 4, at step 418, the method 4000 includes causing the drive controller 1200 to execute an elevator function of the elevator system 1000 based on the user input received at step 416. In particular, the drive controller 1200 performs and/or instructs another component or components of the elevator system 1000 to perform each elevator function associated with the at least one selectable option selected by the user at step 416. For example, the user may, at step 416, select a button from the one or more GUIs associated with the floor selection option. At step 418, the drive controller 1200 may communicate with the elevator drive assembly 1400 to move the elevator car 1100 to a specific floor of the building, corresponding to the floor selected by the user. In another example, the user may, at step 416, select a button from the one or more GUIs associated with the door close option. At step 418, the drive controller 1200 may communicate with a door actuator in the elevator car 1100 to close the door of the elevator car 1100. In another example, the user may, at step 416, select a button from the one or more GUIs associated with the door open option. At step 418, the drive controller 1200 may communicate with the door actuator in the elevator car 1100 to open the door of the elevator car 1100. In another example, the user may, at step 416, select a button from the one or more GUIs associated with the stop option. At step 418, the drive controller 1200 may communicate with elevator drive assembly 1400 to stop movement of the elevator car 1100.

Figure 5:
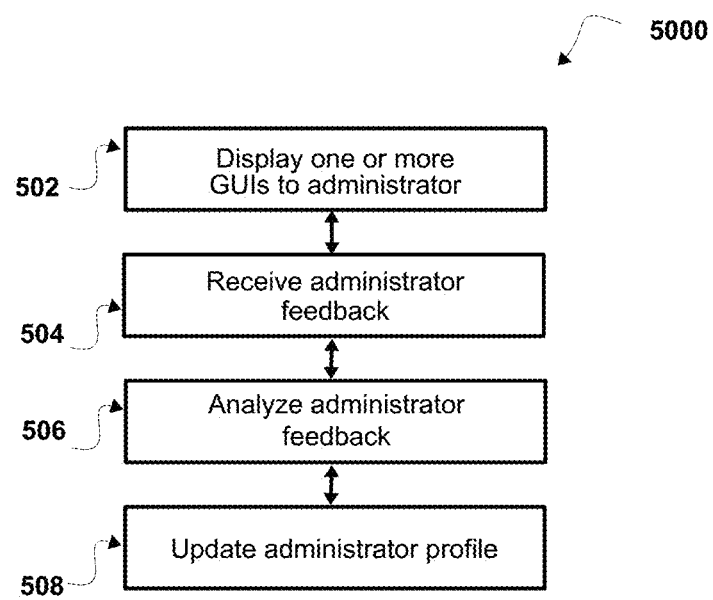
FIG. 5 is a flowchart of a method for receiving feedback from an administrator according to an embodiment of the present disclosure.

Referring now to FIG. 5, the sub-method 5000 provides a more detailed description of step 410 of the method 4000 of FIG. 4. As described above, step 410 of the method 4000 includes receiving feedback from the administrator on the one or more GUIs generated at step 406. As generally described above, step 410 may include analyzing, manipulating, cataloguing, and/or storing the administrator feedback in the administrator profile. More particularly, the feedback received from the administrator may be converted into a data set which may then be aggregated with the data already contained in the administrator profile. The aggregated data in the administrator profile may be subsequently utilized in additional iterations of steps 406 and 408 of the method 4000. Referring now to the method 5000 of FIG. 5, at step 502, the one or more GUIs generated at step 406 of the method 4000 are displayed to the administrator. The administrator may thus view the one or more GUIs, for example, on the client device 202. As further shown in FIG. 5, at step 504, the sub-method 5000 includes receiving administrator feedback based on the one or more GUIs displayed to the administrator at step 502. The administrator feedback may be received, for example, via a user interface of the client device 202. The administrator feedback indicates the degree to which the one or more GUIs generated at step 406 appeals to the administrator. The administrator feedback may be based at least partially on substantially subjective factors, such as the administrator's like or dislike of the color scheme of the one or more GUIs, and/or substantially objective factors, such as the intuitiveness of the layout of the objects on the one or more GUIs. The administrator feedback may be input and received in any data form that can be parsed to quantitatively analyze the administrator feedback. For example, the administrator feedback may be in the form of numerical values selected by the administrator from a predetermined rubric. That is, the administrator may input a numerical value selected from a predetermined scale, such as one (1) to ten (10), based on the appeal of the one or more GUIs to the administrator.

In another example, the administrator may select and input a discrete ranking or classification, such as "Dislike" or "Like" to indicate the appeal of the one or more GUIs to the administrator. The input ranking or classification may then be converted (for example, by the ADR system 204) into a numerical value for quantitative analysis and/or data storage purposes. For example, a ranking or classification of "Dislike" may converted to a value of zero (0), while a ranking or classification of "Like" may converted to a value of one (1). Additional ranking or classification options may also be available to the user. For example, a ranking or classification of "Publish" may cause the method 4000 to proceed immediately to step 412. A ranking or classification of "Publish" may also be converted to a value of one (1) for future quantitative analysis.

As further shown in FIG. 5, at step 506, the sub-method 5000 includes analyzing the administrator feedback. In particular, analyzing the administrator feedback includes identifying specific parameters, and/or combinations of parameters, of the one or more GUIs that appeal to the administrator. The analysis may be performed, for example, by the ADR system 204. The analysis may include comparing the parameters of the one or more GUIs with preferences of the administrator contained in the administrator profile. More particularly, step 506 may include parsing the parameters of objects in the one or more GUIs to determine and/or deduce how the administrator determined the administrator feedback for the one or more GUIs. Each of the parameters of the one or more GUIs may then be classified, using a machine learning algorithm or other suitable process, based on known preferences of the administrator contained in the administrator profile. Based on this classification, the effect of each parameter on the administrator feedback may be determined and/or deduced.

For example, a k-NN classification algorithm may be performed for each parameter, using known administrator preferences contained in the administrator profile to classify the parameter. In such an example, the administrator profile may contain data indicating, based on previously received administrator feedback, the administrator's color preference for buttons. The button color of one or more GUIs may then be classified, utilizing the k-NN classification algorithm, as either a button color that is likely to appeal to the administrator, or as a button color that is unlikely to appeal to the administrator. If the k-NN classification algorithm determines the button color is likely to appeal to the administrator, it may be deduced that the button color of the one or more GUIs positively influenced the administrator feedback, and vice versa. If the k-NN classification algorithm determines the button color is likely to appeal to the administrator, but the administrator feedback was unfavorable (for example, the administrator feedback was "Dislike"), it may be deduced that another parameter or combination of parameters had a strong negative influence on the administrator feedback. Other parameters of the one or more GUIs may be analyzed using the k-NN classification algorithm until it is ascertained which parameter or parameters were likely to cause the administrator to input unfavorable administrator feedback.

As further shown in FIG. 5, at step 508, the sub-method 5000 includes updating the administrator profile based at least partially on the analysis of the administrator feedback performed at step 506. Updating the administrator profile may be performed, for example, by the ADR system 204, and may include generating new data (e.g., data points, parameter values, etc.) for inclusion in the administrator profile. In particular, the ADR system 204, may interpret the deductions made about administrator feedback at step 506, and convert those deductions into new data points or parameter values indicating preferences of the administrator. Using the same example as provided in the above description of step 506, if it is deduced that the button color positively influenced the administrator feedback, the ADR system 204 may generate a new data point indicating that the button color of the one or more GUIs appeals to the administrator. It is noted that the newly generated data point may be duplicitous of other data points or parameter values already in the administrator profile.

The ADR system 204 may also generate new data based on combinations of parameters analyzed at step 506. For example, the ADR system 204 may have deduced from the analysis of the one or more GUIs and the administrator feedback that a specific button color does not appeal to the administrator when the buttons are also a specific shape. The ADR system 204 may generate a new data point or parameter value for inclusion in the administrator profile indicating that the combination of the specific button color and the specific button shape may not appeal to the administrator. However, the new data point or parameter value may also indicate that the specific button color, when used apart with a different button shape, may still appeal to the administrator, and vice versa.

Updating the administrator profile facilitates more robust and efficient iterations of step 406 and step 408 of the method 4000, which respectively include generating the one or more GUIs and calculating the acceptance score. In particular, the presence of the additional data generated at step 508 in the administrator profile provides more data points or parameter values from which to select and/or extrapolate parameters of the objects of the one or more GUIs during generation of the one or more GUIs at step 406. As such, the likelihood that the one or more GUIs generated at step 406 appeals to the administrator may be increased. In particular, the likelihood that the ADR system 204 lacks sufficient data on the administrator's preference to intelligently select parameters for the one or more GUIs is reduced. Accordingly the need to select parameters of the one or more GUIs using arbitrary or non-technical processes, such as random selection, is reduced.

Additionally, the presence of the additional data generated at step 508 in the administrator profile provides more data points or parameter values from which to calculate the acceptance score at step 408. As such, the calculated acceptance score may more accurately reflect the likelihood that the one or more GUIs generated as step 406 will appeal to the administrator. Additionally, more accurate calculation of the acceptance score reduces the likelihood of unappealing GUIs being presented to the administrator, as there is a greater chance that such GUIs will not satisfy the threshold score optionally used at step 412 to determine whether to display the one or more GUIs to the administrator.

For these reasons, updating the administrator profile improves the overall efficiency and performance of at least step 406 and step 408 of the method 4000. It may thus be desirable to perform several iterations of the method 4000 to increase the amount of data contained in the administrator profile.

In some non-limiting embodiments, the administrator profile may not be unique to a specific elevator system, such as the elevator system 1000 described herein. Rather, the administrator profile may be unique to an administrator and may be used for any number of elevator systems administered by the administrator, of which the elevator system 1000 may be one. Thus, updating the administrator profile during the design of the elevator system 1000 may improve the performance and efficiency of the design of subsequently designed elevator systems in which the administrator profile is used. It may be appreciated that, in some non-limiting embodiments, the same administrator may have more than one administrator profile, such as if the administrator wishes to maintain distinct design preference data for elevator systems in different buildings. In other non-limiting embodiments, the administrator profiles of multiple administrators may be combined into a single administrator profile in order to facilitate a collaborative elevator system design by the multiple administrators.

Figure 6:
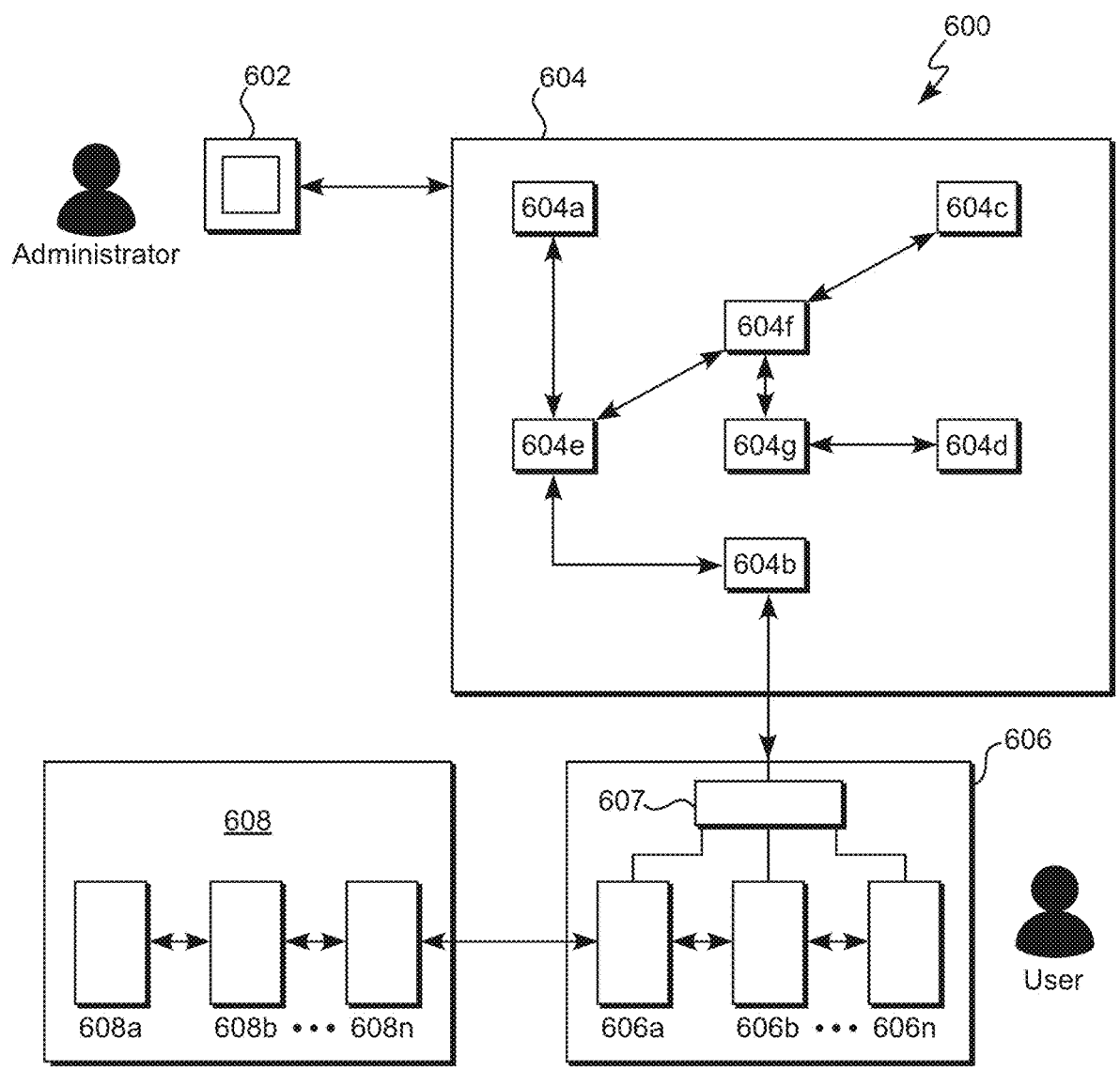
FIG. 6 is a diagram of an implementation of the method of FIG. 4 according to an embodiment of the present disclosure.
Figure 7A:
FIG. 7A-7E are illustrations of display screens with graphical user interfaces of client devices according to embodiments of the present disclosure.
Figure 7B:
Figure 7C:
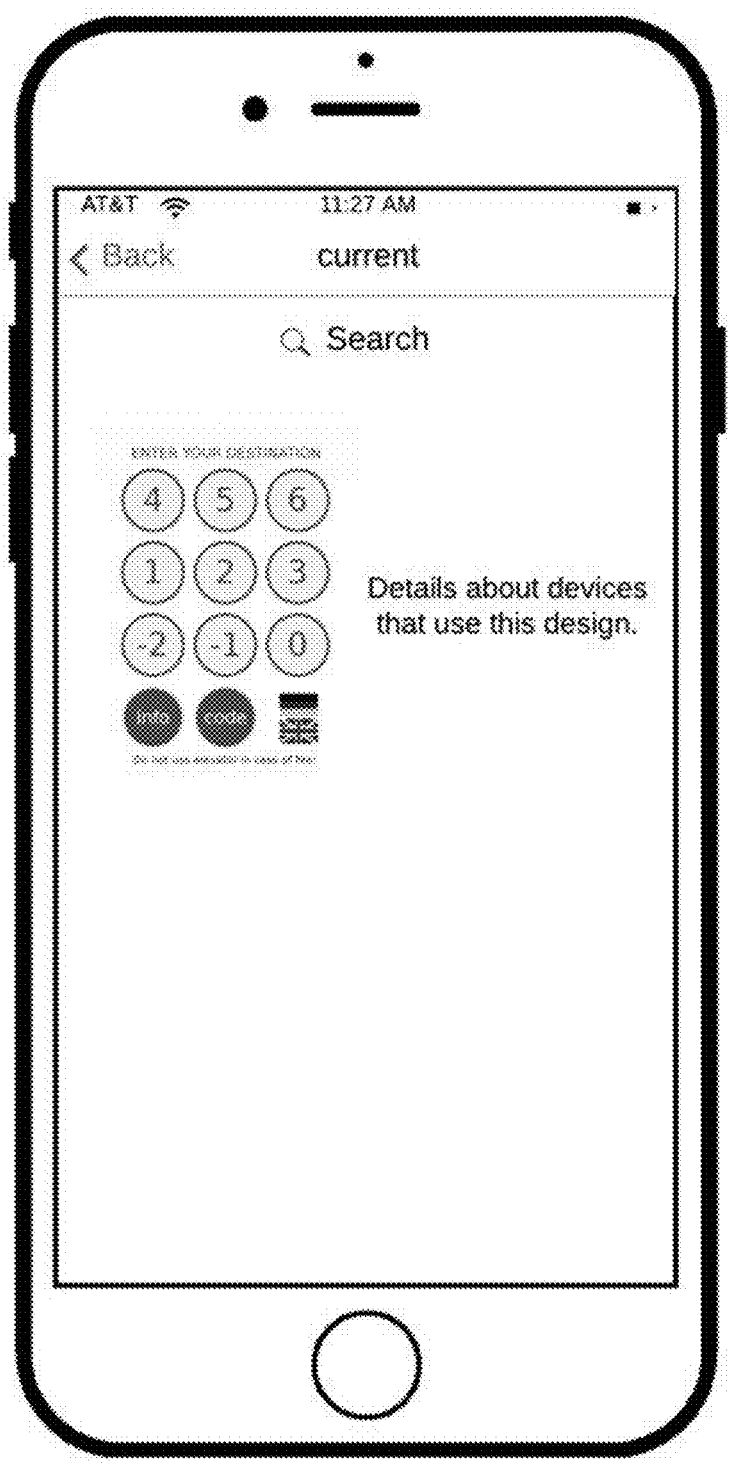
Figure 7D:
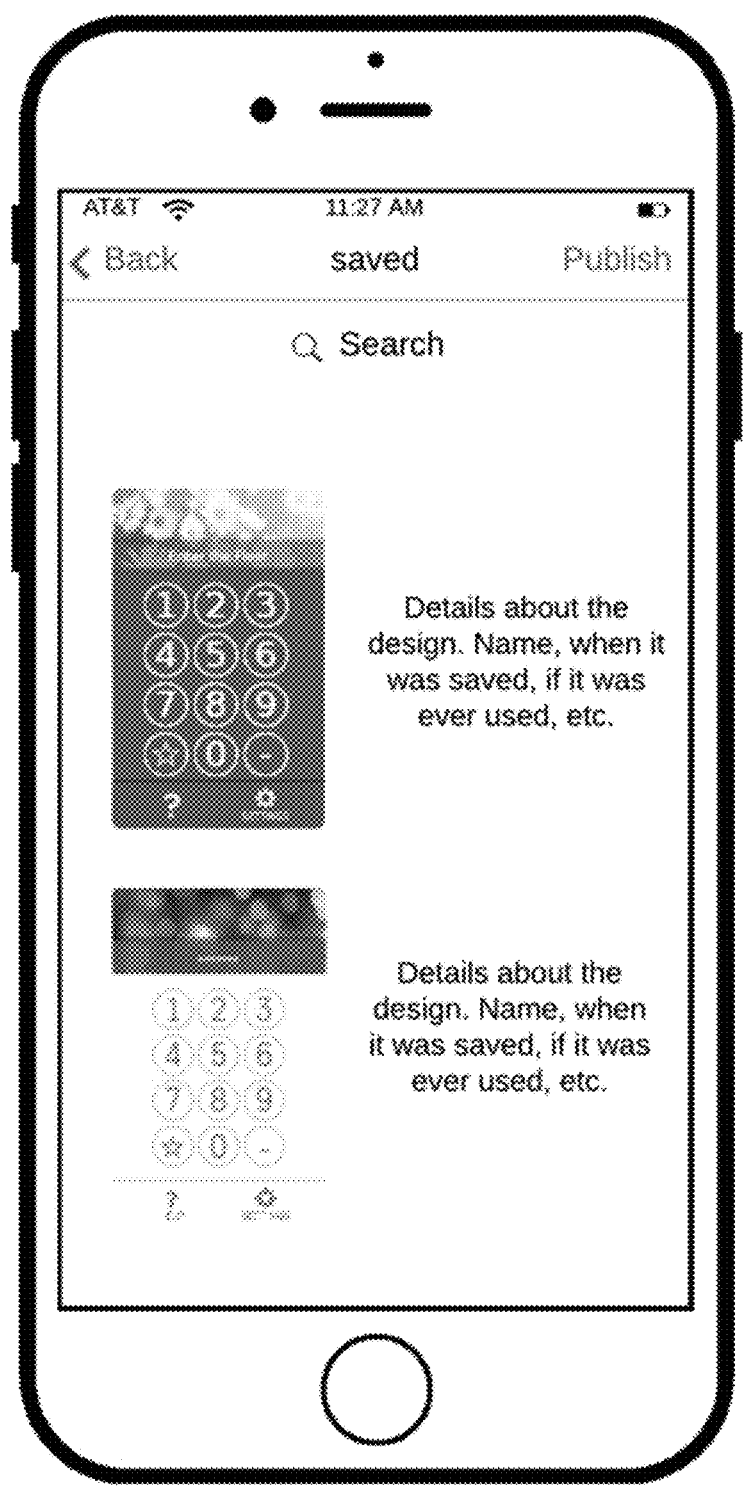
Figure 7E:
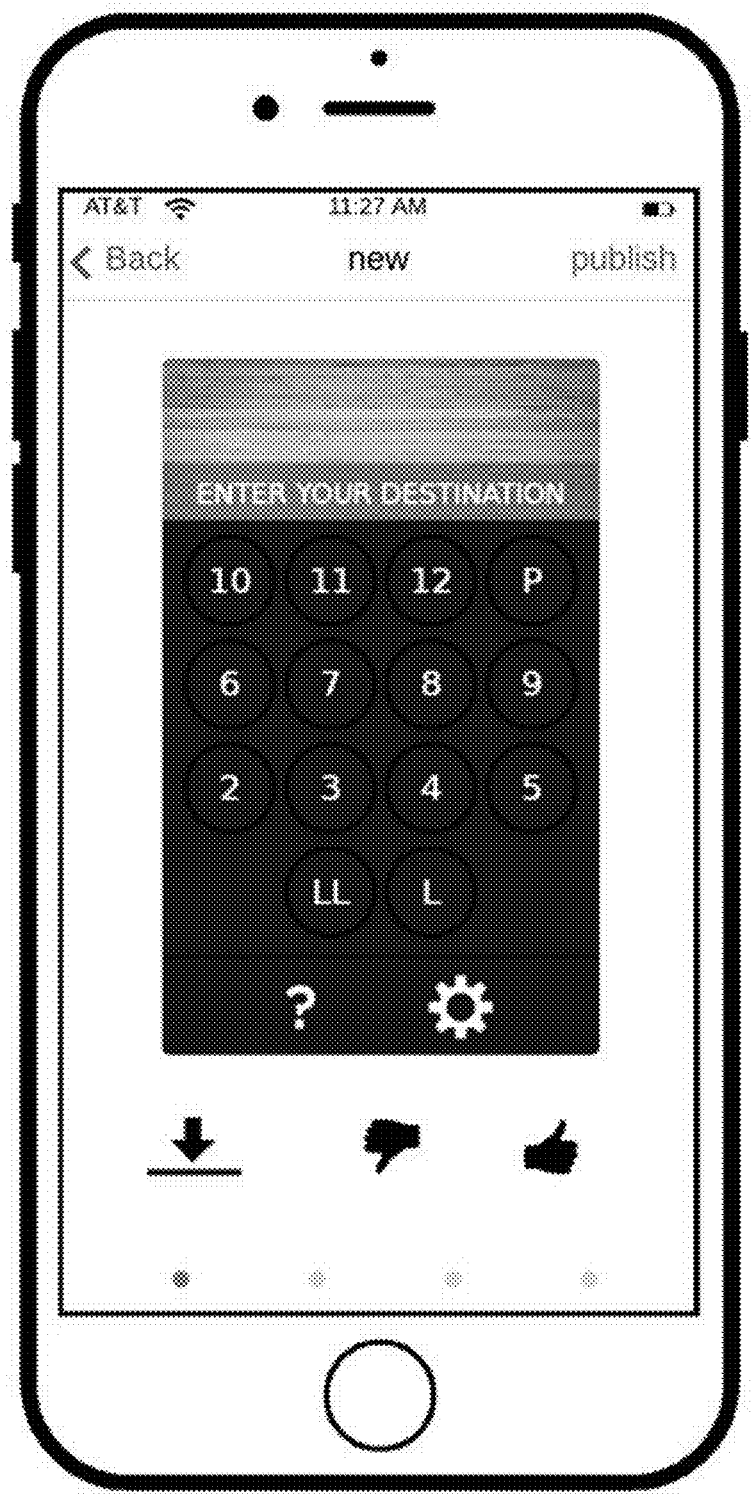

Referring now to FIG. 6, an implementation 6000 may be associated with and/or utilized to execute the method 4000 and the sub-method 5000 described above with reference to FIGS. 4-5. The implementation 6000 may include a client device 602, an automated designer and recommendation (ADR) server 604, an elevator display device network 606, and an elevator drive network 608. The client device 602 may be, or may perform the same or similar functions as, the client device 202 described above. The ADR server 604 may be, or may perform the same or similar functions as, the ADR system 204 described above. The elevator display device network 606 may include one or more devices 606a-606n, each of which may include, or may perform the same or similar functions as, the elevator display device 206 described above. The elevator drive network 608 may include one or more devices 608a-608n, each of which may include the drive controller 1200 and the elevator drive assembly 1400 described above.

The client device 602 may be connected via a wired or wireless connection with the ADR server 604 to facilitate communication between the ADR server 604 and an administrator interacting with the client device 602. The elevator display device network 606 may include, for example, a network switch 607 interconnecting the individual devices 606a-606n to one another and to the ADR server 604, via a wired or wireless connection. The elevator display device network 606 may be connected via a wired or wireless connection to the elevator drive network 608. Each of the individual devices 608a-608n of the elevator display device network 606 may be connected to one or more of the individual devices 608a-608n of the elevator drive network 608. Similarly, each of the individual devices 608a-608n of the elevator drive network 608 may be connected to one or more of the individual devices 608a-608n of the elevator display device network 606. Each of the individual devices 608a-608n of the elevator display device network 606 may facilitate communication between the ADR server 604 and the display device network 606. Further, each of the individual devices 608a-608n of the elevator display device network 606 may facilitate communication between each of the individual devices 608a-608n of the elevator drive network 608 and a user interacting with the elevator display device network 606.

The ADR server 604 may include one or more modules or engines configured to at least partially implement the method 4000 and the sub-method 5000 described above. The ADR server 604 may include a web server 604a in communication with the client device 602 and a network packet transfer module (NPTM) 604b in communication with the elevator display device network 606. The ADR server 604 may include, or otherwise be in communication with, one or more databases storing the elevator display profile, the administrator profile, the feedback received from the administrator, and/or the one or more GUIs described above. For example, the ADR server 604 may include an administrator profile database 604c including the administrator profile and the feedback received from the administrator, and an elevator display profile database 604d including the elevator display profile.

The ADR server 604 may further include a content control system 604e in communication with the web server 604a and the NPTM 604b. The content control system 604e may execute, via at least one processor of the ADR server 604, a software application for allowing the administrator to interact with the ADR server 604 via a web browser on the client device 602.

The ADR server 604 may further include a design recommendation engine 604f in communication with the content control system 604e and the administrator profile database 604c, and a design generation engine 604g in communication with the design recommendation engine 604f and elevator display profile database 604d. The design generation engine 604g may generate, based at least partially on data retrieved from the elevator display profile database 604d, the one or more GUIs as described above. The design recommendation engine 604f may calculate, based at least partially on data retrieved from the administrator profile database 604c, an acceptance score for the one or more GUIs generated by the design generation engine 604g. The design generation engine 604g may generate additional one or more GUIs based at least partially on the acceptance score generated by the design recommendation engine 604f.

The content control system 604e may communicate with the design recommendation engine 604f to allow the administrator to view and provide feedback on the one or more GUIs generated by the design generation engine 604g. Based at least partially on feedback received from the administrator, the content control system 604e may publish the one or more GUIs generated by the design generation engine 604g to the devices 608a-608n of the elevator display device network 606 via the NPTM 604b.

The devices 608a-608n of the elevator display device network 606 may display the one or more GUIs published via the NPTM 604b, and the user may interact with the one or more GUIs via the display device network 606 to control one or more of the devices 608a-608n of the elevator drive network 608.

Referring now to FIGS. 7A-7E, various non-limiting embodiments of screen displays with graphical user interfaces of the client device 202 are shown. FIGS. 7A-7E show the screen displays during various stages of the process of generating the one or GUIS, as described in detail above.

While several examples of an elevator system, a method for controlling an elevator system, and an implementation of the method are shown in the accompanying figures and described in detail hereinabove, other examples will be apparent to and readily made by those skilled in the art without departing from the scope and spirit of the present disclosure. For example, it is to be understood that aspects of the various non-limiting embodiments described hereinabove may be combined with aspects of other non-limiting embodiments while still falling within the scope of the present disclosure. Accordingly, the foregoing description is intended to be illustrative rather than restrictive. The assembly of the present disclosure described hereinabove is defined by the appended claims, and all changes to the disclosed assembly that fall within the meaning and range of equivalency of the claims are to be embraced within their scope.

What is claimed is:

1. An elevator system comprising:
a drive controller configured to actuate a drive motor of an elevator drive assembly;
a non-transitory computer-readable medium comprising program instructions that, when executed by at least one processor, cause the at least one processor to:
retrieve, from an elevator display profile, a set of rules comprising: one or more hardware rules of a first component, one or more software rules of a second component, and one or more elevator operation rules of the elevator system;
generate at least one graphical user interface by applying the set of rules to at least one graphical design template;
calculate an acceptance score for the at least one graphical user interface based on a user profile of an administrator or administrator feedback; and
publish the at least one graphical user interface based at least partially on the acceptance score to a display device;
the display device in communication with the drive controller and the non-transitory computer-readable medium, the display device configured to:
display the at least one graphical user interface after it is published; and
cause the drive controller to actuate the drive motor based on user input of a selection of at least one selectable option on the at least one graphical user interface.

2. The elevator system of claim 1, further comprising:
an elevator shaft having a support frame; and
an elevator car movable along a vertical path or a horizontal path defined by the elevator shaft.

3. The elevator system of claim 1, wherein the at least one processor comprises the drive controller.

4. The elevator system of claim 1, wherein the first component and the second component each comprise the display device.

5. The elevator system of claim 1, wherein the display device comprises a touchscreen interface.

6. The elevator system of claim 5,
wherein the touchscreen interface comprises at least one button;
wherein one or more of the elevator operation rules define drive instructions for actuating the drive motor; and
wherein causing the drive controller to actuate the drive motor based on the user input comprises transmitting the drive instructions to the drive controller in response to the user selecting the at least one button.

7. The elevator system of claim 6, wherein one or more of the software rules comprises a contrast ratio between at least two of the following: a button, a page background, a button border, button text, a button background, a text box border, a text box background, text box text, and an image.

8. The elevator system of claim 5, wherein one or more of the hardware rules comprises at least one of a size of the touchscreen interface, a resolution of the touchscreen interface, a display brightness, a color balance, and a color support.

9. The elevator system of claim 1, wherein the at least one graphical user interface is published based at least partially on the acceptance score by:
determining if the at least one graphical user interface satisfies a threshold score;
displaying the at least one graphical user interface to the administrator; and
in response to receiving approval from the administrator, storing the at least one graphical user interface in a database.

10. The elevator system of claim 9, wherein calculating the acceptance score for the at least one graphical user interface comprises:
assigning a value to one or more parameters of the at least one graphical user interface; and
performing a regression analysis to compare the one or more parameters of the at least one graphical user interface to the same one or more parameters of at least one previously-generated graphical user interface stored in the database.

11. The elevator system of claim 1, wherein the program instructions, when executed by at least one processor, further cause the at least one processor to:
update the user profile of the administrator or administrator feedback based at least partially on feedback received from the administrator;
generate at least one additional graphical user interface by applying the set of rules to the at least one design template; and
calculate a new acceptance score for the at least one additional graphical user interface based on the updated user profile of the administrator.

12. The elevator system of claim 1, wherein applying the set of rules to the at least one design template comprises:
determining whether a conflict exists between any of the one or more software rules and any of the one or more elevator operation rules; and
prioritizing any of the one or more software rules over all of the elevator operation rules in response to determining that the conflict exists.

13. A computer-implemented method for controlling an elevator system, comprising:
retrieving, with at least one processor, from an elevator display profile, a set of rules comprising: one or more hardware rules of a first component, one or more software rules of a second component, and one or more elevator operation rules of the elevator system;
generating, with the at least one processor, at least one graphical user interface by applying the set of rules to at least one design template;
calculating, with the at least one processor, an acceptance score for the at least one graphical user interface based on an user profile of an administrator or administrator feedback;
publishing, with the at least one processor, the at least one graphical user interface based at least partially on the acceptance score;
displaying, with the at least one processor, the at least one graphical user interface on a display device after the at least one graphical user interface is published;
receiving user input of a selection of at least one selectable option on the at least one graphical user interface; and
causing a drive controller to actuate a drive motor of an elevator drive assembly based on the user input.

14. The method of claim 13, wherein the at least one graphical user interface comprises at least one button;
wherein one or more of the elevator operation rules define drive instructions for actuating the drive motor; and
wherein causing the drive controller to actuate the drive motor based on the user input comprises transmitting the drive instructions to the drive controller in response to the user selecting the at least one button.

15. The method of claim 13, wherein publishing the at least one graphical user interface comprises:
determining, with the at least one processor, if the at least one graphical user interface satisfies a threshold score;
displaying, with the at least one processor, the at least one graphical user interface to the administrator; and
in response to receiving approval from the administrator, storing the at least one graphical user interface in a database.

16. The method of claim 13, further comprising:
updating, with the at least one processor, the user profile of the administrator based at least partially on feedback received from the administrator;
generating, with the at least one processor, at least one additional graphical user interface by applying the set of rules to the at least one design template; and
calculating, with at least one processor, a new acceptance score for the at least one additional graphical user interface based on the updated user profile of the administrator.

17. The method of claim 13, wherein applying the set of rules to the at least one design template comprises:
determining, with the at least one processor, whether a conflict exists between any of the one or more software rules and any of the one or more elevator operation rules; and
prioritizing, with the at least one processor, any of the one or more software rules over all of the elevator operation rules in response to determining that the conflict exists.

18. An elevator control apparatus for controlling an elevator system, the elevator control apparatus comprising a non-transitory computer-readable medium including program instructions that, when executed by at least one processor, cause the at least one processor to:
retrieve, from an elevator display profile, a set of rules comprising: one or more hardware rules of a first component, one or more software rules of a second component, and one or more elevator operation rules of the elevator system;
generate at least one graphical user interface by applying the set of rules to at least one design template;
calculate an acceptance score for the at least one graphical user interface based on a user profile of an administrator; and
publish the at least one graphical user interface based at least partially on the acceptance score.

19. The elevator control apparatus of claim 18, wherein publishing the at least one graphical user interface comprises:
determining if the at least one graphical user interface satisfies a threshold score; and
in response to receiving approval from the administrator, storing the at least one graphical user interface in a database.

20. The elevator control apparatus of claim 19, wherein calculating an acceptance score for the at least one graphical user interface comprises:
  assigning a value to one or more parameters of the at least one graphical user interface; and
  performing a regression analysis to compare the one or more parameters of the at least one graphical user interface to the same one or more parameters of at least one previously-generated graphical user interfaces stored in the database.

* * * * *